(12) United States Patent
Cui et al.

(10) Patent No.: US 11,479,243 B2
(45) Date of Patent: Oct. 25, 2022

(54) UNCERTAINTY PREDICTION BASED DEEP LEARNING

(71) Applicant: Honda Motor Co., Ltd., Tokyo (JP)

(72) Inventors: Yuchen Cui, Austin, TX (US); David Francis Isele, Sunnyvale, CA (US); Kikuo Fujimura, Palo Alto, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 533 days.

(21) Appl. No.: 16/508,998

(22) Filed: Jul. 11, 2019

(65) Prior Publication Data

US 2020/0086862 A1    Mar. 19, 2020

Related U.S. Application Data

(60) Provisional application No. 62/731,307, filed on Sep. 14, 2018.

(51) Int. Cl.

| | |
|---|---|
| *G01C 22/00* | (2006.01) |
| *G05D 1/00* | (2006.01) |
| *B60W 30/095* | (2012.01) |
| *B60W 50/14* | (2020.01) |
| *G05D 1/02* | (2020.01) |
| *G06N 3/08* | (2006.01) |

(52) U.S. Cl.
CPC ........ *B60W 30/0953* (2013.01); *B60W 50/14* (2013.01); *G05D 1/0221* (2013.01); *G06N 3/08* (2013.01); *G05D 2201/0213* (2013.01)

(58) Field of Classification Search
CPC .............. B60W 30/0953; B60W 50/14; G05D 1/0221; G05D 2201/0213; G06N 3/08

USPC ........................................................... 701/23
See application file for complete search history.

(56) References Cited

U.S. PATENT DOCUMENTS

| | | | | |
|---|---|---|---|---|
| 2014/0096249 A1* | 4/2014 | Dupont | ................. | G06F 21/552 |
| | | | | 726/23 |
| 2018/0341876 A1* | 11/2018 | Ghosh | ....................... | G06N 5/04 |
| 2019/0122073 A1* | 4/2019 | Ozdemir | .............. | A61B 6/5217 |

(Continued)

OTHER PUBLICATIONS

Christopher M Bishop. Mixture density networks. Technical report, Citeseer, 1994.

(Continued)

*Primary Examiner* — Mahmoud S Ismail
(74) *Attorney, Agent, or Firm* — Rankin, Hill & Clark LLP (57) ABSTRACT

According to one aspect, uncertainty prediction based deep learning may include receiving, using a memory, a trained neural network policy π trained based on a first dataset in a first environment, implementing, via a controller, the trained neural network policy π in a second environment by receiving an input and generating an output y, calculating an uncertainty array U[T] for a time window T, wherein the uncertainty array is indicative of a level of uncertainty associated with an output sample distribution of the output across the time window T based on a temporal divergence, an entropy H, a variational ratio VR, and a standard deviation SD of the output y, and executing, via the controller and one or more systems, an action based on the uncertainty array U[T], such as discontinuing use of the trained neural network policy π.

18 Claims, 5 Drawing Sheets

(56) References Cited

U.S. PATENT DOCUMENTS

2021/0312248 A1* 10/2021 Tchuiev .............. G06K 9/6277

OTHER PUBLICATIONS

Mariusz Bojarski, Davide Del Testa, Daniel Dworakowski, Bernhard Firner, Beat Flepp, Prasoon Goyal, Lawrence D Jackel, Mathew Monfort, Urs Muller, Jiakai Zhang, et al. End to end learning for self-driving cars. arXiv preprint arXiv:1604.07316, 2016.

Mariusz Bojarski, Philip Yeres, Anna Choromanska, Krzysztof Choromanski, Bernhard Firner, Lawrence Jackel, and Urs Muller. Explaining how a deep neural network trained with end-to-end learning steers a car. arXiv preprint arXiv:1704.07911, 2017.

Mia Xu Chen, Orhan Firat, Ankur Bapna, Melvin Johnson, Wolfgang Macherey, George Foster, Llion Jones, Niki Parmar, Mike Schuster, Zhifeng Chen, et al. The best of both worlds: Combining recent advances in neural machine translation. arXiv preprint arXiv:1804.09849, 2018.

Sonia Chernova and Manuela Veloso. Interactive policy learning through confidence-based autonomy. Journal of Artificial Intelligence Research, 34:1-25, 2009.

Felipe Codevilla, Matthias Müller, Alexey Dosovitskiy, Antonio López, and Vladlen Koltun. End-to-end driving via conditional imitation learning. arXiv preprint arXiv:1710.02410, 2017.

Thomas G Dietterich. Ensemble methods in machine learning. In International workshop on multiple classifier systems, pp. 1-15. Springer, 2000.

Alexey Dosovitskiy, German Ros, Felipe Codevilla, Antonio Lopez, and Vladlen Koltun. CARLA: An open urban driving simulator. In Proceedings of the 1st Annual Conference on Robot Learning, pp. 1-16, 2017.

Yarin Gal and Zoubin Ghahramani. Bayesian convolutional neural networks with bernoulli approximate variational inference. arXiv preprint arXiv:1506.02158, 2015.

Yarin Gal, Riashat Islam, and Zoubin Ghahramani. Deep bayesian active learning with image data. arXiv preprint arXiv:1703.02910, 2017.

Yaroslav Ganin, Evgeniya Ustinova, Hana Ajakan, Pascal Germain, Hugo Larochelle, François Laviolette, Mario Marchand, and Victor Lempitsky. Domain-adversarial training of neural networks. The Journal of Machine Learning Research, 17(1):2096-2030, 2016.

Alex Kendall, Vijay Badrinarayanan, and Roberto Cipolla. Bayesian segnet: Model uncertainty in deep convolutional encoder-decoder architectures for scene understanding. arXiv preprint arXiv:1511.02680, 2015.

Alex Kendall and Yarin Gal. What uncertainties do we need in bayesian deep learning for computer vision? In Advances in neural information processing systems, pp. 5574-5584, 2017.

Balaji Lakshminarayanan, Alexander Pritzel, and Charles Blundell. Simple and scalable predictive uncertainty estimation using deep ensembles. In Advances in Neural Information Processing Systems, pp. 6402-6413, 2017.

Michael Laskey, Chris Powers, Ruta Joshi, Arshan Poursohi, and Ken Goldberg. Learning robust bed making using deep imitation learning with dart. arXiv preprint arXiv:1711.02525, 2017.

Keuntaek Lee, Kamil Saigol, and Evangelos Theodorou. Safe end-to-end imitation learning for model predictive control. arXiv preprint arXiv:1803.10231, 2018.

Sergey Levine, Chelsea Finn, Trevor Darrell, and Pieter Abbeel. End-to-end training of deep visuomotor policies. The Journal of Machine Learning Research, 17(1):1334-1373, 2016.

Lihong Li, Michael L Littman, and Thomas J Walsh. Knows what it knows: a framework for self-aware learning. In Proceedings of the 25th international conference on Machine learning, pp. 568-575. ACM, 2008.

Emmanuel Maggiori, Yuliya Tarabalka, Guillaume Charpiat, and Pierre Alliez. Convolutional neural networks for large-scale remote-sensing image classification. IEEE Transactions on Geoscience and Remote Sensing, 55(2):645-657, 2017.

Takeru Miyato, Andrew M Dai, and Ian Goodfellow. Adversarial training methods for semi-supervised text classification. arXiv preprint arXiv:1605.07725, 2016.

Urs Muller, Jan Ben, Eric Cosatto, Beat Flepp, and Yann L Cun. Off-road obstacle avoidance through end-to-end learning. In Advances in neural information processing systems, pp. 739-746, 2006.

Ian Osband. Risk versus uncertainty in deep learning: Bayes, bootstrap and the dangers of dropout. In Proceedings of the NIPS* 2016 Workshop on Bayesian Deep Learning, 2016.

Ian Osband, Charles Blundell, Alexander Pritzel, and Benjamin Van Roy. Deep exploration via bootstrapped dqn. In Advances in neural information processing systems, pp. 4026-4034, 2016.

Dean A Pomerleau. Alvinn: An autonomous land vehicle in a neural network. In Advances in neural information processing systems, pp. 305-313, 1989.

Stéphane Ross and Drew Bagnell. Efficient reductions for imitation learning. In Proceedings of the thirteenth international conference on artificial intelligence and statistics, pp. 661-668, 2010.

Stéphane Ross, Geoffrey Gordon, and Drew Bagnell. A reduction of imitation learning and structured prediction to no-regret online learning. In Proceedings of the fourteenth international conference on artificial intelligence and statistics, pp. 627-635, 2011.

Ashish Shrivastava, Tomas Pfister, Oncel Tuzel, Joshua Susskind, Wenda Wang, and Russell Webb. Learning from simulated and unsupervised images through adversarial training. In CVPR, vol. 2, p. 5, 2017.

David Silver, Julian Schrittwieser, Karen Simonyan, Ioannis Antonoglou, Aja Huang, Arthur Guez, Thomas Hubert, Lucas Baker, Matthew Lai, Adrian Bolton, et al. Mastering the game of go without human knowledge. Nature, 550 (7676):354, 2017.

Nitish Srivastava, Geoffrey Hinton, Alex Krizhevsky, Ilya Sutskever, and Ruslan Salakhutdinov. Dropout: a simple way to prevent neural networks from overfitting. The Journal of Machine Learning Research, 15(1):1929-1958, 2014.

Yichuan Tang and Ruslan R Salakhutdinov. Learning stochastic feedforward neural networks. In Advances in Neural Information Processing Systems, pp. 530-538, 2013.

Jiakai Zhang and Kyunghyun Cho. Query-efficient imitation learning for end-to-end autonomous driving. arXiv preprint arXiv:1605.06450, 2016.

* cited by examiner

UNCERTAINTY PREDICTION BASED DEEP LEARNING

CROSS-REFERENCE TO RELATED APPLICATIONS

This application claims the benefit of U.S. Provisional Patent Application, Ser. No. 62/731,307, filed on Sep. 14, 2018; the entirety of the above-noted application(s) is incorporated by reference herein.

BACKGROUND

One challenge in training end-to-end robotic systems is the scarcity of data. Because human effort is often a constraint during data collection, it is desirable to collect the most useful data possible on each trial. Further, because so many different types of scenarios and/or conditions exist, it is generally difficult to have a training data set which includes every possible situation.

BRIEF DESCRIPTION

According to one aspect, a system for uncertainty prediction based deep learning may include a memory and a controller. The memory may receive a trained neural network policy $\pi$ trained based on a first dataset in a first environment. The controller may implement the trained neural network policy $\pi$ in a second environment by receiving an input and generating an output y. The uncertainty evaluator may calculate an uncertainty array U[T] for a time window T. The uncertainty array may be indicative of a level of uncertainty associated with an output sample distribution of the output across the time window T. The uncertainty evaluator may calculate the uncertainty array U[T] based on a temporal divergence of the output y, an entropy H of the output y, a variational ratio VR of the output y, and a standard deviation SD of the output y. The controller may execute an action based on the uncertainty array U[T].

The first dataset from the first environment may be a generated by a human driver. The controller may implement the trained neural network policy $\pi$ in an autonomous vehicle and the second environment may be a real-world environment. The first environment may be a simulated environment. The action may be a notification action including providing a notification to an occupant of an autonomous vehicle where the trained neural network policy $\pi$ is implemented. The action may be a disengage autonomous driving action including disabling an autonomous driving module of an autonomous vehicle based on an element of the uncertainty array U[T] exceeding an uncertainty threshold. The controller may execute a second action based on the element of the uncertainty array U[T] exceeding the uncertainty threshold, the second action may include updating the trained neural network policy $\pi$. The second action of updating the trained neural network policy $\pi$ may further include receiving image capture data from an image capture device of the autonomous vehicle, receiving one or more steering inputs from one or more vehicle system, and generating the updated trained neural network policy $\pi$ based on the image capture data and one or more of the steering inputs.

The uncertainty evaluator may calculate the uncertainty array U[T] by multiplying the temporal divergence of the output y, the entropy H of the output y, the variational ratio VR of the output y, and the standard deviation SD of the output y. Additionally, the controller may apply a quadratic filter to the uncertainty array U[T].

According to one aspect, a method for uncertainty prediction based deep learning may include receiving a trained neural network policy $\pi$ trained based on a first dataset in a first environment, implementing the trained neural network policy $\pi$ in a second environment by receiving an input and generating an output y, calculating an uncertainty array U[T] for a time window T based on a temporal divergence of the output y, an entropy H of the output y, a variational ratio VR of the output y, and a standard deviation SD of the output y, and executing an action based on the uncertainty array U[T]. The uncertainty array may be indicative of a level of uncertainty associated with an output sample distribution of the output across the time window T.

The method may include implementing the trained neural network policy $\pi$ in an autonomous vehicle and the second environment is a real-world environment. The first environment may be a simulated environment. The action may be a notification action including providing a notification to an occupant of an autonomous vehicle where the trained neural network policy $\pi$ is implemented. The action may be a disengage autonomous driving action including disabling an autonomous driving module of an autonomous vehicle based on an element of the uncertainty array U[T] exceeding an uncertainty threshold or discontinuing use of the trained neural network policy $\pi$. The method may include executing a second action based on the element of the uncertainty array U[T] exceeding the uncertainty threshold. The second action may include updating the trained neural network policy $\pi$. The second action of updating the trained neural network policy $\pi$ may include receiving image capture data from an image capture device of the autonomous vehicle, receiving one or more steering inputs from one or more vehicle systems, and generating the updated trained neural network policy $\pi$ based on the image capture data and one or more of the steering inputs. The method may include calculating the uncertainty array U[T] by multiplying the temporal divergence of the output y, the entropy H of the output y, the variational ratio VR of the output y, and the standard deviation SD of the output y. The method may include applying a quadratic filter to the uncertainty array U[T].

According to one aspect, a system for uncertainty prediction based deep learning may include a memory and a controller. The memory may receive a trained neural network policy $\pi$ trained based on a first dataset in a first environment. The controller may implement the trained neural network policy $\pi$ within an autonomous vehicle travelling through a second, real-world environment by receiving an input and generating an output y via an autonomous driving module. The uncertainty evaluator may calculate an uncertainty array U[T] for a time window T. The uncertainty array may be indicative of a level of uncertainty associated with an output sample distribution of the output across the time window T. The uncertainty evaluator may calculate the uncertainty array U[T] based on a temporal divergence of the output y, an entropy H of the output y, a variational ratio VR of the output y, and a standard deviation SD of the output y. The controller may execute an action based on the uncertainty array U[T]. The action may be a disengage autonomous driving action including disabling the autonomous driving module based on an element of the uncertainty array U[T] exceeding an uncertainty threshold or discontinuing use of the trained neural network policy $\pi$.

DETAILED DESCRIPTION

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, mobile devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator (BSI) system, a lane keep assist (LKAS) system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

Figure 1:
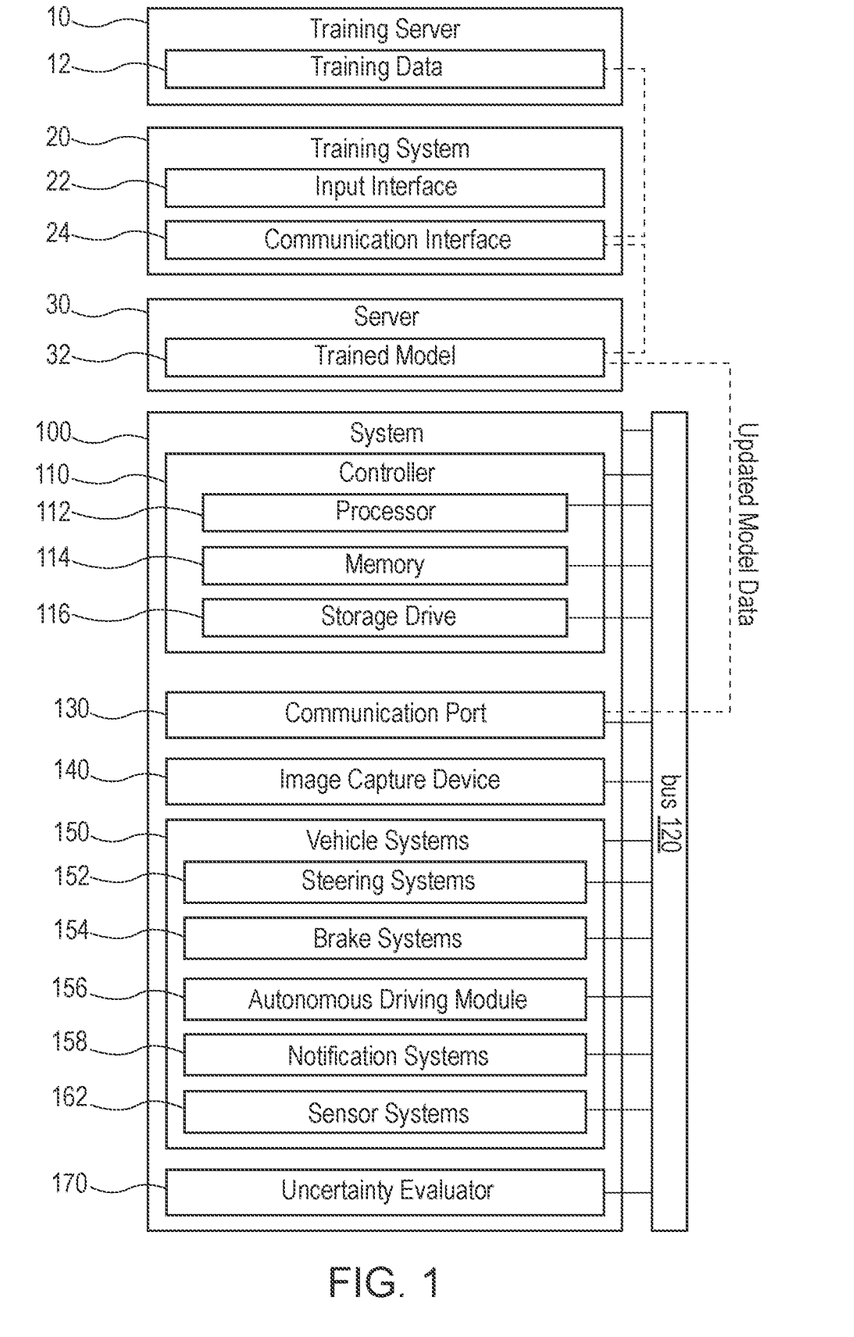
FIG. 1 is an exemplary component diagram of a system for uncertainty prediction based deep learning, according to one aspect.

FIG. 1 is an exemplary component diagram of a system 100 for uncertainty prediction based deep learning, according to one aspect. A training server 10 may house or store training data 12 (e.g., a first dataset). The first dataset from the first environment may be generated by a human driver and include a video sequence or a series of images, each of which are associated with user inputs, such as acceleration and steering inputs. In this way, a trained neural network policy π may be trained by a human driver. This training data 12 may be used, via demonstration and observation, by a training system 20 to train a neural network. For example, the training system 20 may include an input interface 22 for receiving user inputs and a communication interface 24 to receive the training data 12. In any event, the training system 20 may generate a trained model associated with the trained neural network policy π and perform the training in a first environment, such as a simulation environment. According to another aspect, the first environment may be the real-world environment. The trained model 32 may be stored to a server 30, via the communication interface 24, which may communicate a trained neural network policy π (e.g., trained model 32) to the system 100 for uncertainty prediction based deep learning.

The system 100 for uncertainty prediction based deep learning may include a controller 110, a processor 112, a memory 114, a storage drive 116, a bus 120, a communication port 130, an image capture device 140, one or more vehicle systems 150, such as, but not limited to steering systems 152, brake systems 154, an autonomous driving model 156, notification systems 158, sensor systems 162. The controller 110 may include the process, the memory 114, and the storage drive 116. Additionally, the system 100 for uncertainty prediction based deep learning may include an uncertainty evaluator 170, which may be implemented via the processor 112.

The controller 110 may implement the trained neural network policy π in a second environment by receiving an input and generating an output y. According to one aspect, the controller 110 may implement the trained neural network policy π in an autonomous vehicle and the second environment may be a real-world environment. The input may be determined from the image capture device 140 and/or one or more of the vehicle systems 150, such as the sensor systems. The input may be image capture data from the real-world environment. The trained neural network policy π may direct the action selection for the autonomous vehicle. In other words, action selection for the autonomous vehicle may be modeled as a map represented by the trained neural network policy π, and implemented via the autonomous driving module, the controller 110, and one or more of the vehicle systems 150 (e.g., the steering systems, the brake systems, etc.).

Uncertainty Aware Data Aggregation for Deep Imitation Learning

Given an end-to-end continuous control task and an initial model, it may be desirable to improve a model's performance with as few data points as possible while mitigating visits to a series of sub-optimal states. In this regard, the uncertainty evaluator 170 may calculate an uncertainty array U[T] for a time window T. The uncertainty array may be indicative of a level of uncertainty associated with an output sample distribution of the output across the time window T. In other words, for time steps within the time window T or time step, the uncertainty array may be indicative of the uncertainty or a predictive uncertainty of a state associated with the corresponding system. Explained yet another way, elements of the uncertainty array U[T] may be analyzed by the controller 110 or the processor 112 to ensure that undesirable (e.g., trusted) states are not entered for the system 100 for uncertainty prediction based deep learning or for the system to identify deviations from known behavior. In this way, the elements of the uncertainty array U[T] may be analyzed to anticipate errors or untrained aspects of the trained neural network policy π.

The uncertainty evaluator 170 may calculate the uncertainty array U[T] based on a temporal divergence of the output y, an entropy H of the output y, a variational ratio VR of the output y, and a standard deviation SD of the output y. According to one aspect, the uncertainty evaluator 170 may calculate the uncertainty array U[T] by multiplying the temporal divergence of the output y, the entropy H of the output y, the variational ratio VR of the output y, and the standard deviation SD of the output y. The elements of the uncertainty array U[T] may be indicative of an uncertainty estimation. Additionally, the controller 110 may apply a quadratic filter to the uncertainty array U[T].

Given an input (e.g., an image and/or measurements x), an end-to-end control system may output normalized continuous signals y (e.g., a steering angle of a vehicle). Applying MC-Dropout, a set of output samples may be drawn for the same input x from multiple forward passes, with which a discrete distribution of the output samples may be obtained. A desirable uncertainty score for the uncertainty array U[T] may capture a level of inconsistency in this discrete sample distribution from all aspects.

Let $\{y^n\}$ denote the set of discretized output samples drawn from forward passes, c denote a class, and c* denote the mode (which may be used as an actual control output). Entropy H and variational ratio VR may be considered two measures for capturing categorical uncertainty:

$$H(\{y^n\}) = -\sum \frac{\sum_n 1[y^n, c]}{N} \log\left[\frac{\sum_n 1[y^n, c]}{N}\right] \quad (1)$$

$$VR(\{y^n\}, c*) = 1 - \frac{\sum_n 1[y^n, c*]}{N} \quad (2)$$

1[ . . . ] may denote the indicator function

At the same time, end-to-end control models may operate on a time-series input and output continuous control signals. Therefore, the standard deviation may be computed (from the mode) SD and temporal divergence TD of $\{y^n\}$, i.e. the KL-divergence between the output distribution of time step k and (k−1). Let $\{y^n\}_k$ be the output set at time step k (conditioned on input $x_k$):

$$SD(\{y^n\}, c*) = \frac{\sum_n \|y^n - c*\|2}{N} \quad (3)$$

$$TD(\{y^n\}_k, \{y^n\}_{k-1}) = KL[p(\{y^n\}_k)\|p(\{y^n\}_{k-1})] \quad (4)$$

Combining the above measures, the uncertainty score (e.g., an element of the uncertainty array U[T]) may describe or be indicative of the level of inconsistency in the output sample distribution by taking into account categorical uncertainty, temporal smoothness, and the expected error in the output distribution:

$$U(\{\{y^n\}_k, \{y^n\}_{k-1}) = [TD(\{y^n\}_k, \{y^n\}_{k-1}) \cdot H(\{y^n\}_k) \cdot (VR(\{y^n\}_k, c^*) + \lambda SD(\{y^n\}_k, c^*)]^2 \quad (5)$$

Empirically, TD, VR, and H values are noisy when used alone, and therefore, are multiplied by the uncertainty estimator as one term in the uncertainty score function for calculation of elements of the uncertainty array U[T]. The $\lambda$ term may be used to weigh SD such that all the terms are on the same order of magnitude. The SD may be related to the steering and throttle errors. Applying a quadratic filter may further reduce noise and balance false-positive and true-positive rates. Examples of types of uncertainty estimations signals to be evaluated include Steering Error $SD_{steer}$, Throttle Error $SD_{throttle}$, and Total Uncertainty ($U_{steer} + \alpha U_{throttle}$).

Method for Uncertainty Prediction Based Deep Learning
Input: Environment P, Initial Demonstrations $D_0$, Expert Policy $\pi^*$, Uncertainty Threshold $\eta$, Time Window T, Sample Size N, Learning Episodes E, Batch Size B;
Output: Policy $\pi$

---

Initialize demonstration set $D = D_0$;
Repeat for E times:
    1) Train neural network policy $\pi$ with D;
    2) Sample initial state $s_0$ from P and set t = 0;
    3) Initialize Uncertainty Array U[T];
    4) While size of D is less than B:
        a) Obtain $\{y^n\}_t$ with MC-Dropout on $s_t$;
        b) Compute U[t mod T] = $U(\{y^n\}_t, \{y^n\}_{t-1})$;
        c) D = D ∪ $\{s_t, \pi^*(s_t)\}$;
        d) if $\Sigma_{k=0}^{T} U[k] > \eta$: $s_t = P(s_t, \pi^*(s_t))$ ;
        e) else: $s_t = P(s_t, \pi(s_t))$;
return $\pi$

---

In step 1) of the method for uncertainty prediction based deep learning, the neural network policy $\pi$ may be trained using D or the training data 12 from the training server 10. In step 2), the initial state may be set. In step 3), the uncertainty evaluator 170 calculates values of the uncertainty array U[T]. In step 4), if the error is greater than the uncertainty threshold, the expert policy may be implemented (e.g., applying human control to the autonomous vehicle and disabling the trained neural network policy $\pi$) and used to update the trained neural network policy $\pi$. In this way, detection of adversarial states may be performed based on the values or scores from the uncertainty array U[T]. Per-frame uncertainty in a short time window T may be accumulated for estimating the total uncertainty at time t to decide whether the agent should switch control to the human expert. The action that the expert takes may be then recorded as a possible optimal action for all input frames. The data collection and model training process may alternate. MC-Dropout may be applied to discard randomization.

The controller 110 may execute an action based on the uncertainty array U[T]. The action may be a notification action including providing a notification to an occupant of an autonomous vehicle where the trained neural network policy $\pi$ is implemented.

Discontinue Use of Trained Neural Network Policy

As a consequence of the uncertainty array U[T] exceeding an uncertainty threshold, the controller 110 may provide a notification to the occupant of the autonomous vehicle that there exists an uncertainty for the autonomous operation in that the current surroundings may be unfamiliar with respect to the trained neural network policy $\pi$. In this regard, the controller 110 may execute a disengage autonomous driving action including disabling an autonomous driving module of an autonomous vehicle based on an element of the uncertainty array U[T] exceeding the uncertainty threshold.

Second Training Phase

The controller 110 may execute a second action based on the element of the uncertainty array U[T] exceeding the uncertainty threshold, and the second action may include updating the trained neural network policy $\pi$. The second action of updating the trained neural network policy $\pi$ may further include receiving image capture data from an image capture device 140 of the autonomous vehicle, receiving one or more steering inputs from one or more vehicle system, and generating the updated trained neural network policy $\pi$ based on the image capture data and one or more of the steering inputs. For example, the image capture sensor may detect or capture images of the surrounding real-world environment which is associated with exceeding the uncertainty threshold, and thus, indicative of an environment where the system is unsure whether it has been trained on or not.

In this way, the system 100 for uncertainty prediction based deep learning may generate the updated trained neural network policy based on a trigger where the element of the uncertainty array U[T] exceeds the uncertainty threshold. For example, if the trained neural network policy $\pi$ may be trained according to a first weather condition, but not a second weather condition or trained according to a first road type but not a second road type. When the sensor systems of the system 100 for uncertainty prediction based deep learning detect these unknown conditions (e.g., the second weather condition and the second road type, which are not associated with the training data 12 or the trained neural network policy $\pi$), the uncertainty evaluator 170 may determine the values for the uncertainty array U[T] and execute a corresponding action, such as notifying an occupant that there is uncertainty for autonomous operation (e.g., that the system has encountered unknown terrain, weather conditions, etc.), disabling autonomous operation according to the trained neural network policy $\pi$, or updating the trained neural network policy $\pi$ based on user inputs and the unknown or conditions which are unassociated with the training data 12 or the trained neural network policy $\pi$.

Figure 2:
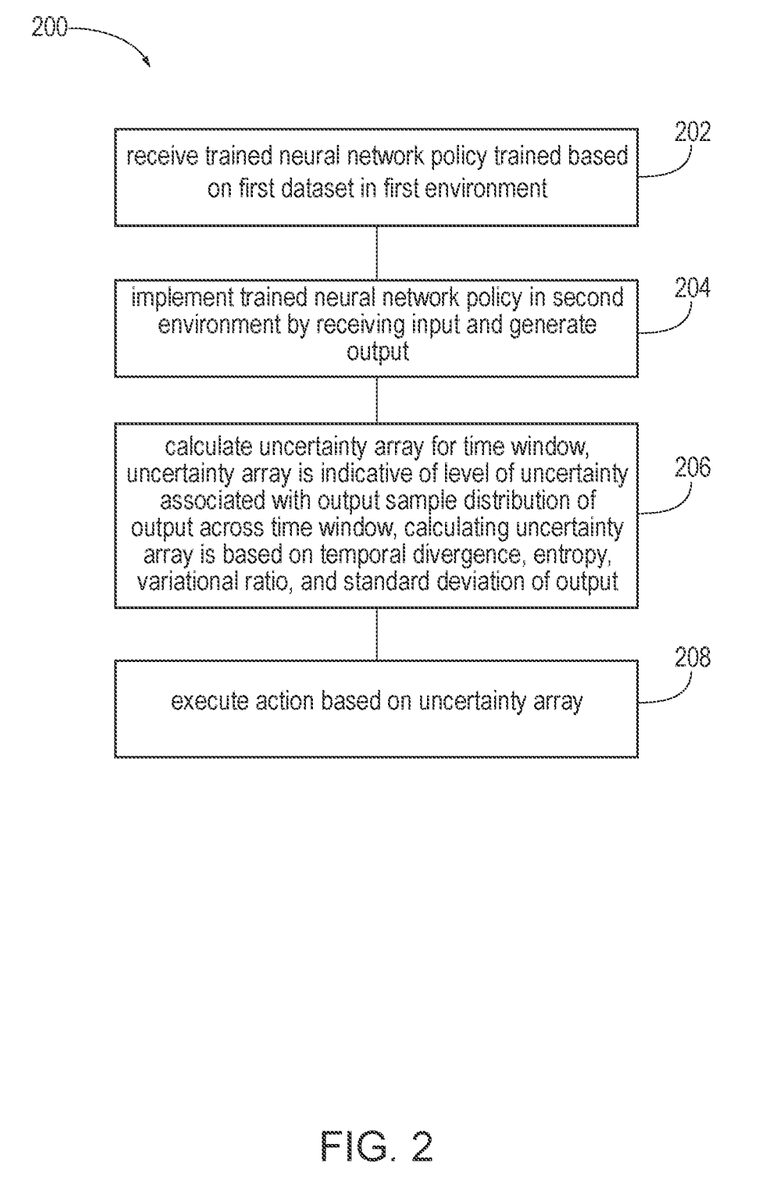
FIG. 2 is an exemplary flow diagram of a method for uncertainty prediction based deep learning, according to one aspect.

FIG. 2 is an exemplary flow diagram of a method 200 for uncertainty prediction based deep learning, according to one aspect. The method 200 for uncertainty prediction based deep learning may include receiving 202 the trained neural network policy $\pi$ trained based on the first dataset in the first environment. For example, the trained neural network policy $\pi$ may be trained using the first dataset which may be based on the human driver driving in the first environment, which may be the simulated environment or the real-world environment. The method 200 may include implementing 204 the trained neural network policy $\pi$ in the second environment by receiving the input and generating the output y. The implementation of the trained neural network policy $\pi$ may be within the autonomous driving module of the autonomous vehicle, for example. In this regard, the autonomous vehicle may be autonomously operated, via the controller 110, using the trained neural network policy $\pi$. In this regard, the second environment may be the real-world environment.

The method 200 may include calculating 206 an uncertainty array U[T] for the time window T based on the temporal divergence of the output y, the entropy H of the output y, the variational ratio VR of the output y, and the standard deviation SD of the output y, and executing 208 the action based on the uncertainty array U[T]. The uncertainty array may be indicative of the level of uncertainty associated with the output sample distribution of the output across the time window T. For example, when the deviation or error prediction associated with the uncertainty array U[T] exceeds the predetermined threshold, the action may be executed via the controller 110 and the vehicle systems 150. Examples of actions may include providing the notification, returning control of the autonomous vehicle to the occupant by discontinuing use of the trained neural network policy $\pi$, continuing, retraining, or updating the the trained neural network policy $\pi$ by sensing one or more steering inputs and image capture data from the autonomous vehicle and/or corresponding real-world environment to update the trained neural network policy $\pi$ or generate an updated neural network policy.

Figure 3:
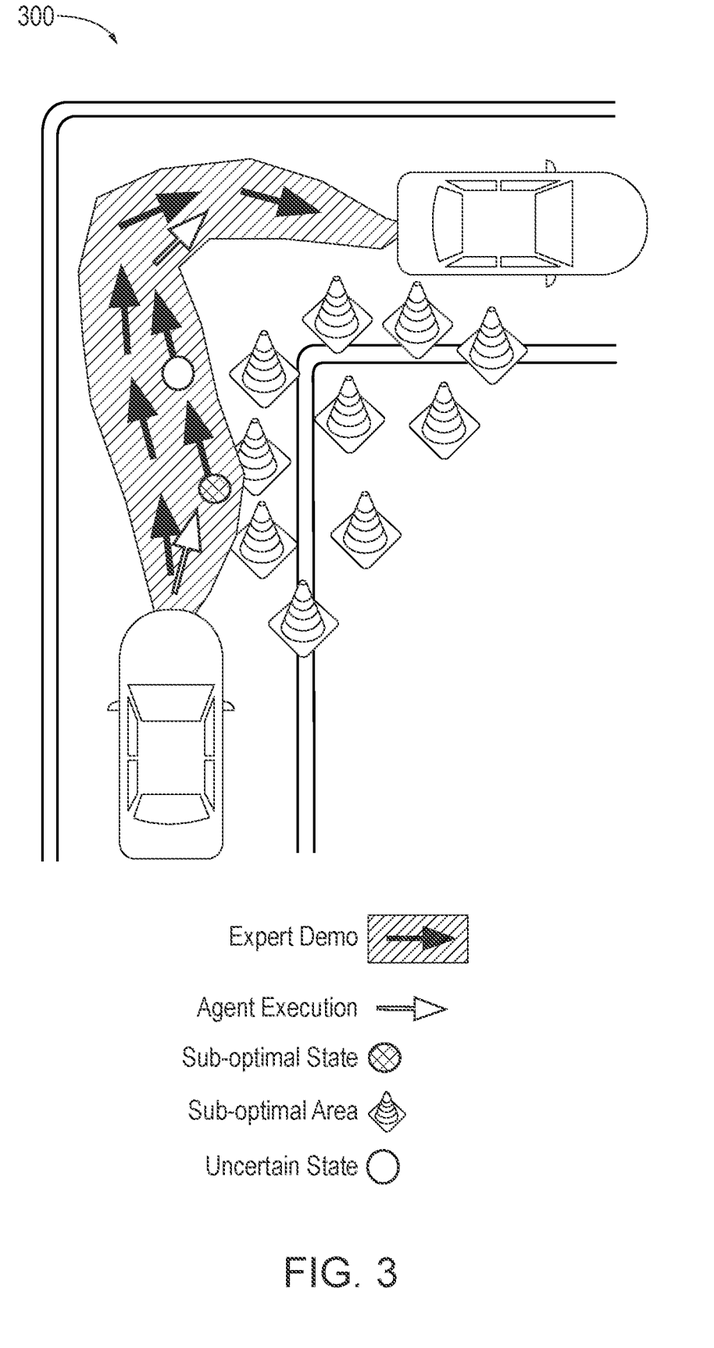
FIG. 3 is an exemplary implementation using the system for uncertainty prediction based deep learning of FIG. 1, according to one aspect.

FIG. 3 is an exemplary implementation 300 using the system 100 for uncertainty prediction based deep learning of FIG. 1, according to one aspect. It can be seen that the expert demonstration is indicated by the solid black arrows, while the agent execution according to the trained neural network policy $\pi$ is indicated by the white arrows. The sub-optimal state is indicated by the hashed area, and the sub-optimal areas indicated by traffic cones, which may be associated with construction, for example. The uncertain state is indicated by the white circle. When the uncertainty evaluator 170 determines that an element of the uncertainty array U[T] exceeds an uncertainty threshold, the controller 110 may execute an action in response, as discussed above.

Figure 4:
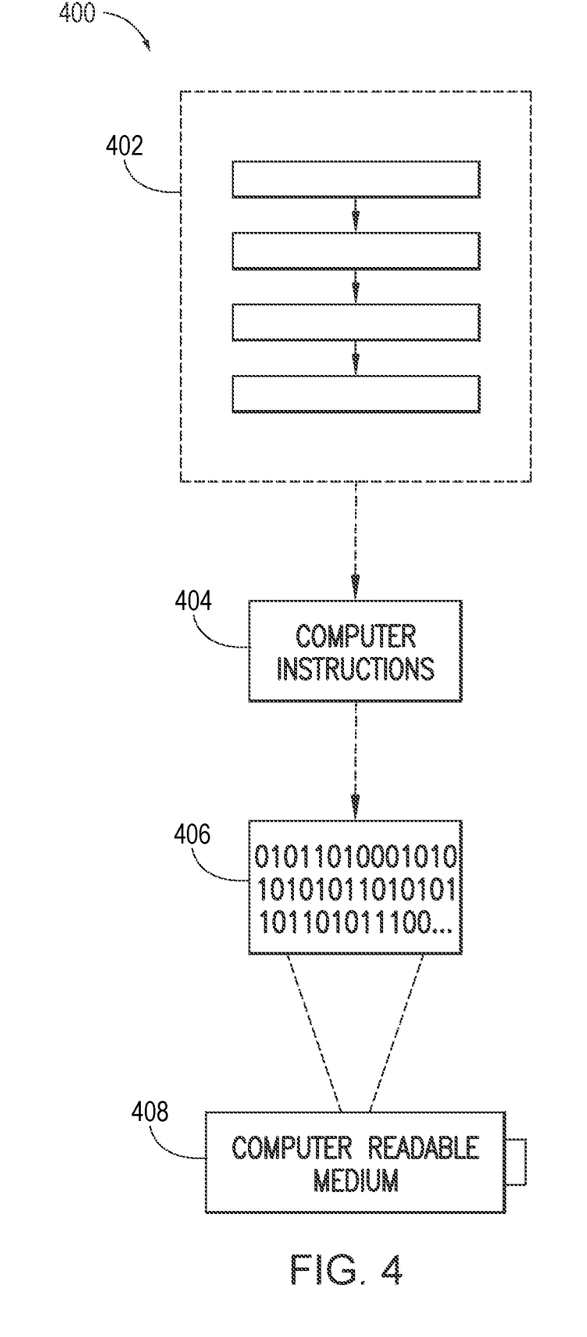
FIG. 4 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 4, wherein an implementation 400 includes a computer-readable medium 408, such as a CD-R, DVD-R, flash drive, a platter of a hard disk drive, etc., on which is encoded computer-readable data 406. This encoded computer-readable data 406, such as binary data including a plurality of zero's and one's as shown in 406, in turn includes a set of processor-executable computer instructions 404 configured to operate according to one or more of the principles set forth herein. In this implementation 400, the processor-executable computer instructions 404 may be configured to perform a method 402, such as the method 200 of FIG. 2. In another aspect, the processor-executable computer instructions 404 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 5:
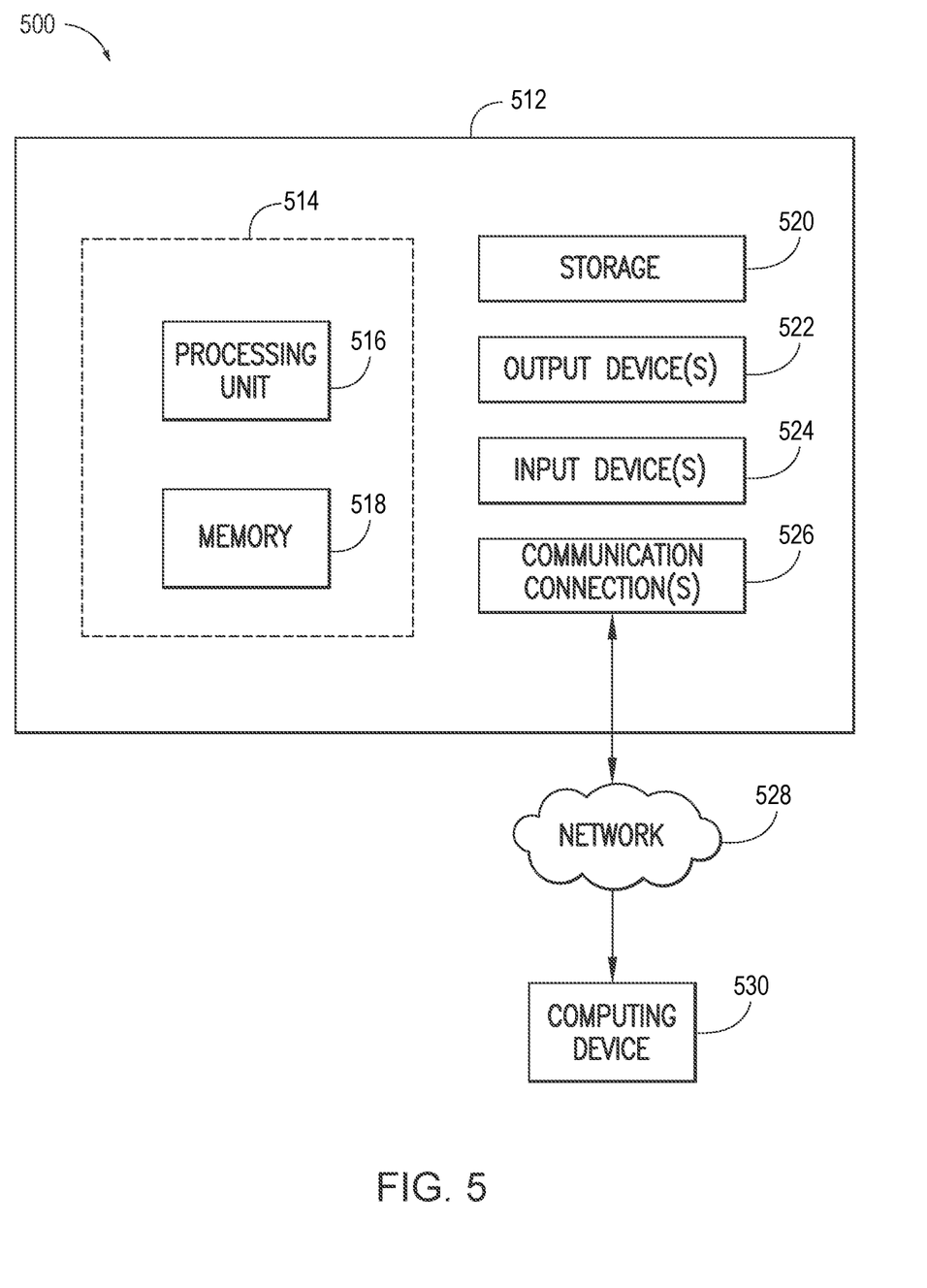
FIG. 5 is an illustration of an example computing environment where one or more of the provisions set forth herein are implemented, according to one aspect.

FIG. 5 and the following discussion provide a description of a suitable computing environment to implement aspects of one or more of the provisions set forth herein. The operating environment of FIG. 5 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 5 illustrates a system 500 including a computing device 512 configured to implement one aspect provided herein. In one configuration, the computing device 512 includes at least one processing unit 516 and memory 518. Depending on the exact configuration and type of computing device, memory 518 may be volatile, such as RAM, non-volatile, such as ROM, flash memory, etc., or a combination of the two. This configuration is illustrated in FIG. 5 by dashed line 514.

In other aspects, the computing device 512 includes additional features or functionality. For example, the computing device 512 may include additional storage such as removable storage or non-removable storage, including, but not limited to, magnetic storage, optical storage, etc. Such additional storage is illustrated in FIG. 5 by storage 520. In one aspect, computer readable instructions to implement one aspect provided herein are in storage 520. Storage 520 may store other computer readable instructions to implement an operating system, an application program, etc. Computer readable instructions may be loaded in memory 518 for execution by processing unit 516, for example.

The term "computer readable media" as used herein includes computer storage media. Computer storage media includes volatile and nonvolatile, removable and non-removable media implemented in any method or technology for storage of information such as computer readable instructions or other data. Memory 518 and storage 520 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 512. Any such computer storage media is part of the computing device 512.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 512 includes input device(s) 524 such as keyboard, mouse, pen, voice input device, touch input device, infrared cameras, video input devices, or any other input device. Output device(s) 522 such as one or more displays, speakers, printers, or any other output device may be included with the computing device 512. Input device(s) 524 and output device(s) 522 may be connected to the computing device 512 via a wired connection, wireless connection, or any combination thereof. In one aspect, an input device or an output device from another computing device may be used as input device(s) 524 or output device(s) 522 for the computing device 512. The computing device 512 may include communication connection(s) 526 to facilitate communications with one or more other devices 530, such as through network 528, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An uncertainty prediction based deep learning controller, comprising:
a memory receiving a trained neural network policy π trained based on a first dataset in a first environment;
a controller implementing the trained neural network policy π in a second environment by receiving an input and generating an output y; and
an uncertainty evaluator, implemented via a processor, calculating an uncertainty array U[T] for a time window T, wherein the uncertainty array is indicative of a level of uncertainty associated with an output sample distribution of the output across the time window T, wherein the uncertainty evaluator calculates the uncertainty array U[T] based on a temporal divergence of the output y, an entropy H of the output y, a variational ratio VR of the output y, and a standard deviation SD of the output y,
wherein the controller executes an action based on the uncertainty array U[T],
wherein the action is a disengage autonomous driving action including disabling an autonomous driving module of an autonomous vehicle based on an element of the uncertainty array U[T] exceeding an uncertainty threshold.

2. The uncertainty prediction based deep learning controller of claim 1, wherein the first dataset from the first environment is generated by a human driver.

3. The uncertainty prediction based deep learning controller of claim 1, wherein the controller implements the trained neural network policy π in an autonomous vehicle and the second environment is a real-world environment.

4. The uncertainty prediction based deep learning controller of claim 3, wherein the first environment is a simulated environment.

5. The uncertainty prediction based deep learning controller of claim 1, wherein the action is a notification action including providing a notification to an occupant of an autonomous vehicle where the trained neural network policy π is implemented.

6. The uncertainty prediction based deep learning controller of claim 1, wherein the controller executes a second action based on the element of the uncertainty array U[T] exceeding the uncertainty threshold, the second action including updating the trained neural network policy π.

7. The uncertainty prediction based deep learning controller of claim 6, wherein the second action of updating the trained neural network policy π includes:
receiving image capture data from an image capture device of the autonomous vehicle;
receiving one or more steering inputs from one or more vehicle systems; and
generating the updated trained neural network policy π based on the image capture data and one or more of the steering inputs.

8. The uncertainty prediction based deep learning controller of claim 1, wherein the uncertainty evaluator calculates the uncertainty array U[T] by multiplying the temporal divergence of the output y, the entropy H of the output y, the variational ratio VR of the output y, and the standard deviation SD of the output y.

9. The uncertainty prediction based deep learning controller of claim 8, wherein the controller applies a quadratic filter to the uncertainty array U[T].

10. A computer-implemented method for uncertainty prediction based deep learning, comprising:
receiving, via a processor, a trained neural network policy π trained based on a first dataset in a first environment;
implementing, via the processor, the trained neural network policy π in a second environment by receiving an input and generating an output y;
calculating, via the processor, an uncertainty array U[T] for a time window T, wherein the uncertainty array is indicative of a level of uncertainty associated with an output sample distribution of the output across the time window T, wherein the calculating the uncertainty array U[T] is based on a temporal divergence of the output y, an entropy H of the output y, a variational ratio VR of the output y, and a standard deviation SD of the output y; and
executing, via the processor, an action based on the uncertainty array U[T],
wherein the action is a disengage autonomous driving action including disabling an autonomous driving module of an autonomous vehicle based on an element of the uncertainty array U[T] exceeding an uncertainty threshold.

11. The computer-implemented method for uncertainty prediction based deep learning of claim 10, comprising implementing the trained neural network policy π in an autonomous vehicle and the second environment is a real-world environment.

12. The computer-implemented method for uncertainty prediction based deep learning of claim 11, wherein the first environment is a simulated environment.

13. The computer-implemented method for uncertainty prediction based deep learning of claim 10, wherein the action is a notification action including providing a notification to an occupant of an autonomous vehicle where the trained neural network policy π is implemented.

14. The computer-implemented method for uncertainty prediction based deep learning of claim 10, comprising executing a second action based on the element of the uncertainty array U[T] exceeding the uncertainty threshold, the second action including updating the trained neural network policy π.

15. The computer-implemented method for uncertainty prediction based deep learning of claim 14, wherein the second action of updating the trained neural network policy π includes:

receiving image capture data from an image capture device of the autonomous vehicle;
receiving one or more steering inputs from one or more vehicle systems; and
generating the updated trained neural network policy π based on the image capture data and one or more of the steering inputs.

16. The computer-implemented method for uncertainty prediction based deep learning of claim 10, comprising calculating the uncertainty array U[T] by multiplying the temporal divergence of the output y, the entropy H of the output y, the variational ratio VR of the output y, and the standard deviation SD of the output y.

17. The computer-implemented method for uncertainty prediction based deep learning of claim 10, comprising applying a quadratic filter to the uncertainty array U[T].

18. A system for uncertainty prediction based deep learning, comprising:
a memory receiving a trained neural network policy π trained based on a first dataset in a first environment;
a controller implementing the trained neural network policy π within an autonomous vehicle travelling through a second, real-world environment by receiving an input and generating an output y via an autonomous driving module; and
an uncertainty evaluator, implemented via a processor, calculating an uncertainty array U[T] for a time window T, wherein the uncertainty array is indicative of a level of uncertainty associated with an output sample distribution of the output across the time window T, wherein the uncertainty evaluator calculates the uncertainty array U[T] based on a temporal divergence of the output y, an entropy H of the output y, a variational ratio VR of the output y, and a standard deviation SD of the output y,
wherein the controller executes an action based on the uncertainty array U[T], wherein the action is a disengage autonomous driving action including disabling the autonomous driving module based on an element of the uncertainty array U[T] exceeding an uncertainty threshold.

* * * * *